UNITED STATES PATENT OFFICE.

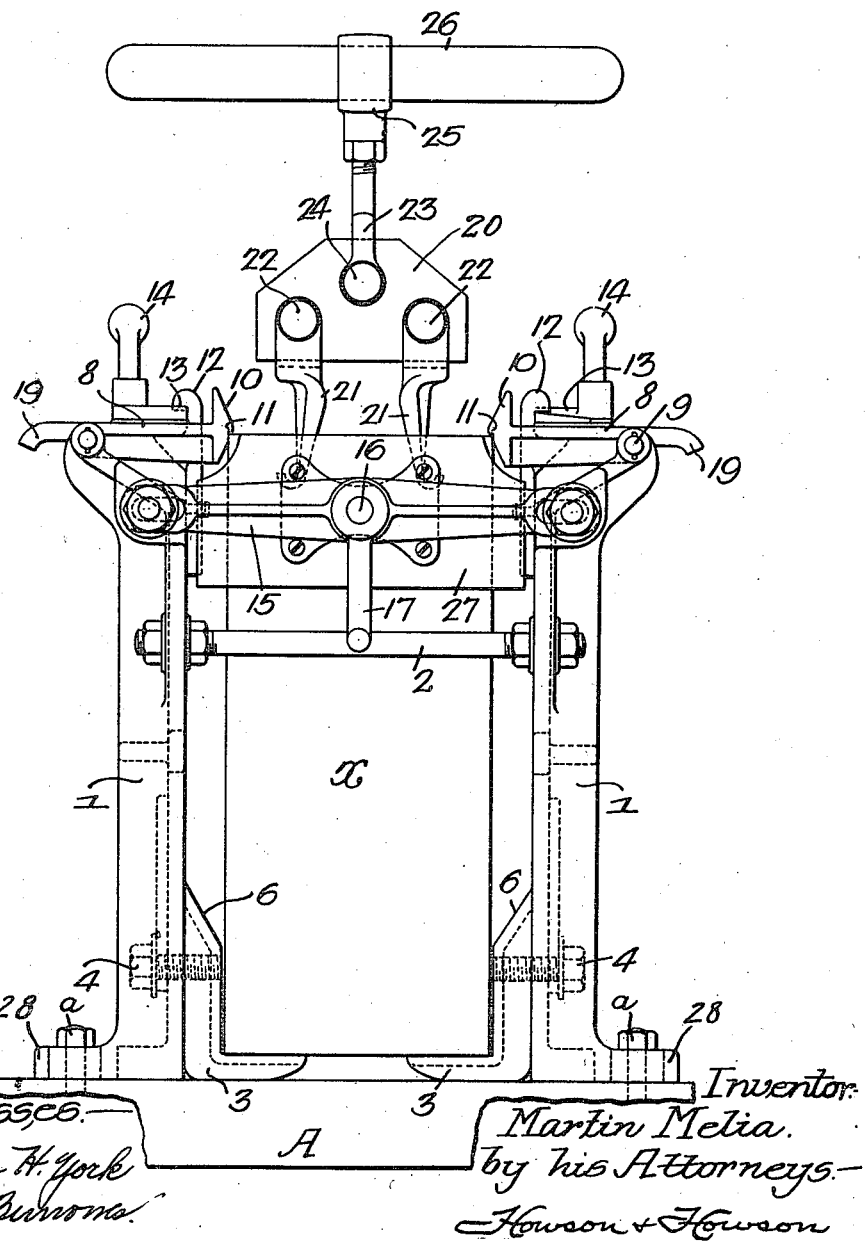

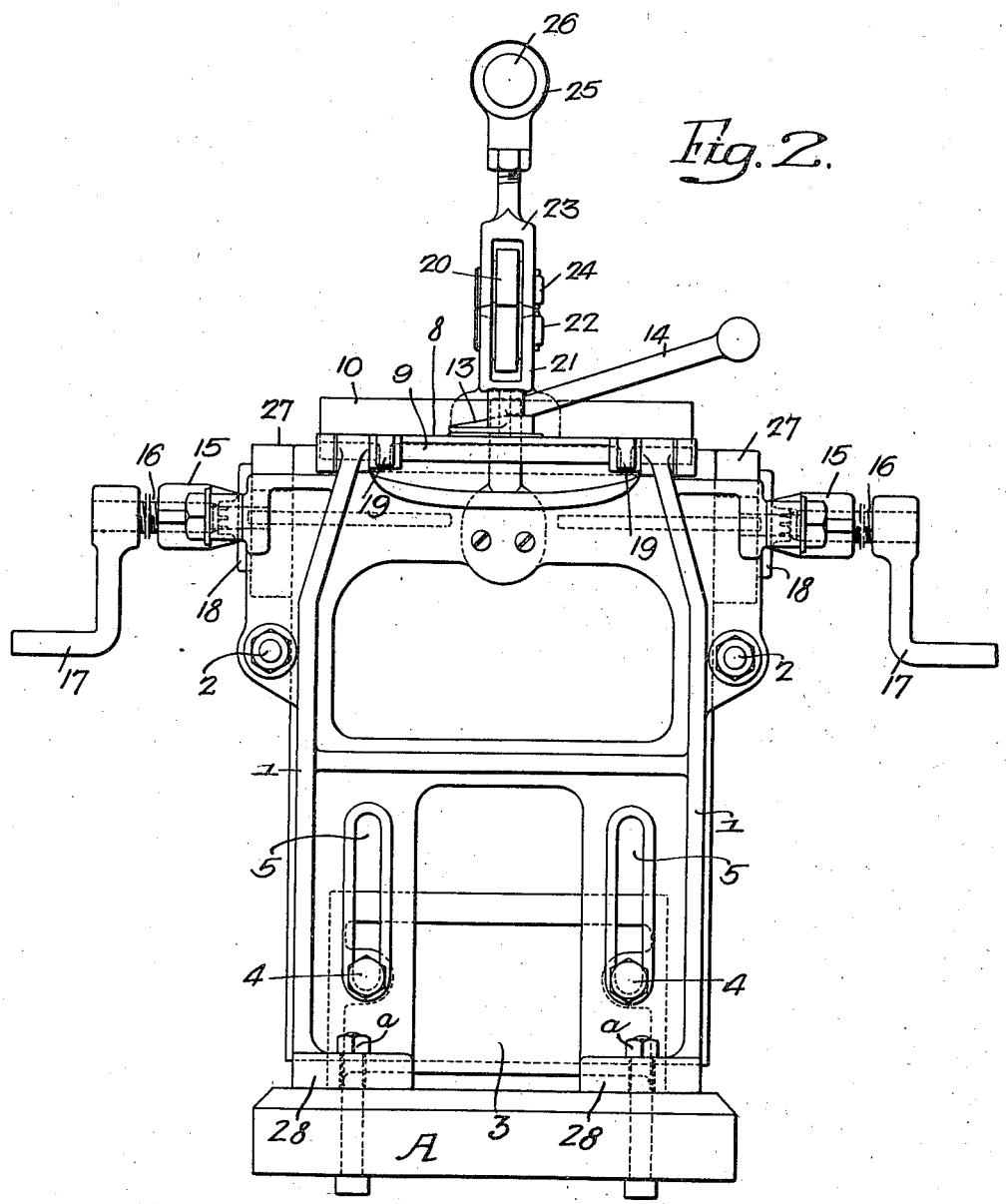

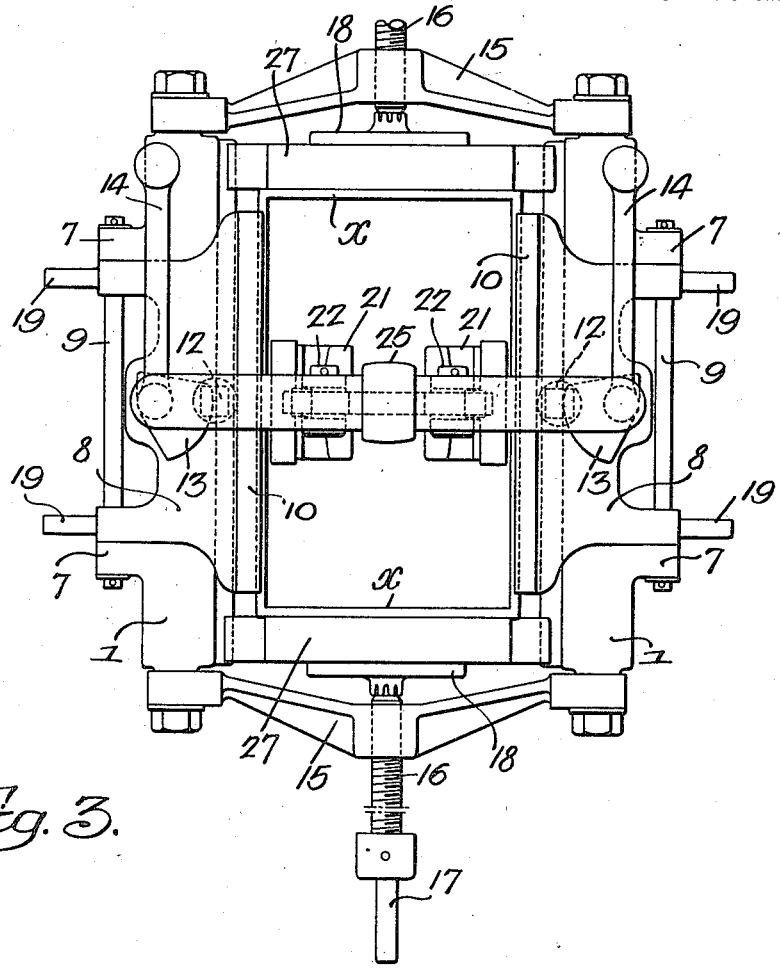

MARTIN MELIA, OF PHILADELPHIA, PENNSYLVANIA, ASSIGNOR TO COMMERCIAL TRUCK COMPANY OF AMERICA, OF PHILADELPHIA, PENNSYLVANIA, A CORPORATION OF PENNSYLVANIA.

BATTERY-ELEMENT PULLER.

1,284,409. Specification of Letters Patent. Patented Nov. 12, 1918.

Application filed June 12, 1915. Serial No. 33,776.

*To all whom it may concern:*

Be it known that I, MARTIN MELIA, a citizen of the United States, residing in Philadelphia, Pennsylvania, have invented certain Improvements in Battery-Element Pullers, of which the following is a specification.

One object of my invention is to provide a novel, easily operated and substantial combination of parts for holding a battery cell or container while its electrodes are being forcibly removed, the invention including a device for exerting pressure on the upper parts of the sides of said cell or for holding it against sidewise expansion during this operation and at such other times as it may be required.

Another object of the invention is to provide a cell holding device which may be readily adjusted to accommodate battery jars of different widths and heights and which may be quickly operated to receive and firmly hold or lock a jar after it has been inserted therein, the invention contemplating a novel form of jar-engaging member so made as to facilitate the return of the battery elements to the jar, together with novel means for locking said member in its holding position.

I further desire to provide a novel, simple and substantial form of electrode-engaging member for forcibly withdrawing the battery elements when the cell or container is properly held.

These objects and other advantageous ends I secure as hereinafter set forth, reference being had to the accompanying drawings, in which:

Figures 1 and 2 are respectively side and front elevations of a battery element puller constructed according to my invention, and Fig. 3 is a plan of the apparatus illustrated in the other figures.

In the above drawings 1 represents two similar frames preferably made of substantial casting mounted on a base structure A to which they are rigidly held by bolts *a* passing through suitably elongated slots in their feet 28. They are also adjustably connected by bolts 2 which extend between suitable side lugs so as to leave between them a space for the reception of a battery cell X.

Since battery cells vary considerably in height, I provide means whereby the device may be adjusted to receive and hold cells of different heights with their top edges at the same level, and for this purpose I provide two suitably formed supporting brackets 3 of L-shaped section, each connected to the inside face of one of the frames 1 by a pair of bolts 4 extending through vertically elongated slots 5 therein. These holding brackets have their horizontal flanges extended toward each other and the upper ends of their vertical flanges are each beveled toward the face of the adjacent frame member as indicated at 6 so that a battery cell X when placed in the device is guided into engagement with said horizontal flanges.

For holding the battery cell in the device against vertical movement, I provide the upper edges of each of the frames 1 with a pair of lugs 7 and by means of a pivot bolt 9 hinged to each of these an edge-holding plate 8. Said plates are preferably T-shaped in section, having their adjacent edges provided with heads 10 extending at right angles to their general plane and tapering in both directions from their central portions to their edges as shown in Fig. 1. That portion of the inclined face of each of these heads which extends outwardly and downwardly when said members 8 are in their cell-holding positions, has a transverse notch 11 designed to receive one of the top side edges of a battery cell and for the purpose of retaining these holding members in their operative positions, I mount on the upper part of each of the side frames 1 a hook shaped latch 12 whose upper end projects through a suitable opening in the holding member 8. This latch is designed to coöperate with a locking cam 13 fixed to a handle 14 rotatably mounted on said holding member and formed of gradually increasing thickness from one radial edge to the other, being designed to fit between the top surface of this cell holding member 8 and the under side of the hook 12, from which it may be freed by a suitable rotation of the handle 14. Each of the cell-holding plates 8 at its outer edge is provided with a pair of projecting lugs 19 designed to engage the outer sides of the frame members 1 when said plates are swung on their pivot bolts 9, in order to prevent their moving very far beyond a substantially vertical plane through said bolts, In addition to having the bolts 2, the opposite sides of the frame members 1 are connected adjacent their upper parts by bars 15 which at their centers are each provided with a boss having through it a threaded passage for the reception of a screw 16. The ends of said bars are formed with elongated slots through which pass bolts whereby they are connected to said frame members 1 while allowing of the adjustment of the latter toward or from each other. The outer end of each screw is provided with an operating crank handle 17 while its inner end, through a ball and socket joint, is connected to a plate 18 carrying a block 27 designed to engage the upper portion of the sides of a storage battery cell mounted between the two frame members 1, to prevent breakage thereof when the electrodes are forcibly removed.

For engaging the electrodes of the battery cell I provide a pulling device consisting of a block 20 of fiber or other insulating material, on which are pivotally hung two hooks 21 made with their centers of gravity in such positions that when hanging freely, their center lines diverge downwardly with their laterally extending lower ends for engagement with metallic strips connecting the electrodes, projecting in opposite directions. These hooks are hinged or pivoted to the block 20 by bolts 22 and a handle 23 is likewise pivoted to said block by a pin 24, while its upper end is threaded into a boss formed on a ring 25 in which is mounted a transversely extending bar 26.

As will be understood by those skilled in the art, it is frequently found that after more or less prolonged use the electrodes of a storage battery swell or change their shape so that the walls of the rubber cells in which they are mounted are tightly engaged or in some instances are bulged outwardly so that it is a practical impossibility to remove the electrodes without breaking the cell, the breakage in some cases amounting to 100%.

In using my device to prevent such breakage the supporting brackets 3 are raised to a height such as will bring the upper edge of a battery cell carried by them into a position immediately adjacent a plane through the pivot bolts 9, after which the bolts 4 are set up so as to retain them in this position, and after such a cell has been inserted in the position shown in Fig. 1, the plates 8 are swung over to cause their notches 11 to fit on to the upper opposite edges of said cell. The handles 14 are then turned to bring the thin edges of the cams 13 under the hooks 12, and such turning is continued until the plates 8 are rigidly locked in their holding positions. Thereafter the hooks 21 of the pulling device are engaged with the metallic connecting strips of the battery electrodes and these are forcibly drawn upward, the apparatus with the cell being held down by the operator who stands on the base piece A.

If the sides of the battery cell have bulged to such an extent that the forcible withdrawal of the electrodes through its narrow top portion would break the same, I set up the screws 16 to cause the blocks 27 to engage the upper parts of the sides of the cell and thus prevent such expansion thereof as would cause injury. In some cases when the bulging or swelling of the cell has progressed to such an extent that the withdrawal of the electrodes is not possible, I may soften its sides, as by the application of heat, and press them into proper form by one or a number of operations of the screws 16 until the cell has been caused to assume such a shape as will allow the safe removal of the electrodes.

It is noted that owing to the shape of the hooks 21 of the pulling device, the upward force exerted upon them tends to swing and hold them in positive engagement with the straps of the electrodes, it being necessary to move them toward each other in order that they may be primarily engaged with these parts. After the electrodes have been removed, the cell may be released from the holding device by backing off the screws 16 with their blocks 27 and so turning the handles 14 as to cause the cams 13 to release the hooks 12, whereupon the holding plates 8 may be swung outwardly on their pivot bolts 9 into positions in which their limit lugs 19 engage the sides of the frame 1.

It is to be noted that by upwardly flaring the heads 10 of the cell holding elements or plates 8, as shown, the electrodes belonging to such cell may be introduced without the possibility of their catching on the top edges or of becoming disarranged as their lower ends are entered in said cell. Said heads 10 are also flared downwardly so that even though the top edges of the cell are irregular in form or bowed to a greater or less extent, they will be engaged and straightened as the members 8 are forced down by the cams, until finally the top edge of the cell rests in the notch 11. When necessary the frame members 1 may be moved together or separated by slacking off the bolts $a$ and after adjusting said members, tightening said bolts again.

I claim:—

1. A battery element puller including a frame consisting of a base; two oppositely placed side members thereon; devices carried by said members for holding the battery cell from longitudinal movement; and means for exerting pressure against the sides of said cell at will.

2. A battery element puller including a frame for holding a battery cell against longitudinal movement; means for pulling electrodes from the cell; and means for preventing expansion of the sides of said cell while the electrodes are being forcibly removed.

3. A battery element puller including a frame for holding a cell against longitudinal movement; pressure blocks placed to engage opposite sides of said cell; and screws for adjusting said blocks at will.

4. A battery element puller including a frame; members hinged thereto and adjustable to engage the upper edges of a battery cell; with means for locking said members in their holding positions consisting of cams and coöperating latches.

5. The combination in a battery element puller of a frame consisting of two connected members spaced apart; plates hinged to the upper parts of said members in positions to engage opposite upper edges of a cell mounted between the frame members; with means for locking said plates in their cell engaging positions consisting of latches respectively mounted on the frame members, and coöperating cams mounted on the plates.

6. A battery cell holding device including a frame having overhanging portions formed to engage opposite top edges of a battery cell to hold the same against longitudinal movement; and means for compressing opposite faces of said cell at will.

7. A battery element puller including a frame; means for preventing longitudinal movement of a cell mounted in the frame; means for forcibly withdrawing the electrodes from such cell; screws threaded in opposite portions of the frame; cell engaging blocks respectively carried by the screws; and handles for operating the screws.

8. A battery element puller consisting of two connected frame members spaced apart; vertically adjustable cell supporting brackets mounted on said frame members; and means for holding a cell from longitudinal movement after it has been placed upon said brackets between the frame members.

9. A battery element puller consisting of two connected frame elements; angle brackets vertically adjustable on said frame members respectively; means for clamping said brackets in any given position; with means for preventing longitudinal movement of a battery cell carried on the brackets.

10. A battery element puller consisting of two connected frame elements; angle brackets vertically adjustable on said frame members respectively and having upwardly projecting members inclined at their upper ends; means for clamping said brackets in any given position; with means for preventing longitudinal movement of a battery cell carried on the brackets.

11. A battery element puller consisting of two connected frame members; plates of T-shaped section respectively pivoted to said members and having stem portions normally extending across the ends of the latter; with means engaging said stem portions for locking said plates in position to engage certain edges of a battery cell mounted between the frame members.

12. A battery element puller including two frame members; cell holding elements hinged respectively to said members and each provided with a head having a laterally extending notch; and means including cams and latches for locking said elements with the notched portions of their heads engaging certain edges of a battery cell mounted between the frame members.

13. A battery element puller consisting of a frame; two plates hinged to opposite sides of said frame in positions to engage certain edges of a battery cell mounted therein; latches fixed to the frame; cams of increasing thickness rotatable on said plates in position to respectively engage the latches; and handles for rotating the cams.

14. A battery element puller consisting of a handle; and two outwardly extending electrode engaging hooks pivoted thereto and formed to normally hang under the action of gravity with their center lines diverging downwardly.

15. A battery element puller including a body of insulating material; two oppositely directed electrode engaging hooks pivoted thereto and each formed with its laterally projecting part extending to one side of its general center line; and a handle connected to said body of insulating material.

16. A battery element puller consisting of a base; a pair of oppositely placed cell holding elements mounted on said frame; opposite members connecting the upper portions of said cell holding elements; and cell clamping means carried by said members in position to prevent expansion of the upper part of the cell held by said elements.

MARTIN MELIA.